2,736,740

METHOD OF MAKING GAMMA-CYANOVALERIC ACID

Carl Bordenca and Henry G. Sellers, Jr., Birmingham, Ala., assignors to Newport Industries, Inc., Pensacola, Fla., a corporation of Delaware No Drawing. Application May 14, 1953, Serial No. 355,194

5 Claims. (Cl. 260—465.4)

This invention relates to a method of making gamma-cyanovaleric acid, and more particularly to an economic method of making gamma-cyanovaleric acid from gamma-valerolactone.

We have now found that gamma-valerolactone can be converted into a gamma-cyanovalerate by fusion with a metal cyanide, such as sodium cyanide, and gamma-cyanovaleric acid liberated by acidification. The yield of gamma-cyanovaleric acid is greatly increased, in accordance with our improved method, by using a previously prepared crude gamma-cyanovalerate as the flux for a further fusion reaction between a metal cyanide and gamma-valerolactone. The gamma-cyanovaleric acid can be further hydrolyzed in accordance with known methods to give alpha-methyl glutaric acid, with an overall yield of 70%, or better, based upon the starting gamma-valerolactone. Alpha-methyl glutaric acid is a dibasic acid having particular advantages in the making of esters for use as lubricants, plasticizers and detergents.

It is therefore an important object of this invention to provide a method for making gamma-cyanovaleric acid from gamma-valerolactone.

It is a further important object of this invention to provide an economical method for producing gamma-cyanovaleric acid in high yield from gamma-valerolactone by fusion at atmospheric pressure in a flux consisting essentially of gamma-cyanovalerate, of gamma-valerolactone with an alkali metal or alkaline earth metal cyanide followed by acid hydrolysis of the gamma-cyanovalerate to the corresponding acid.

Other and further important objects of this invention will become apparent from the following description and appended claims.

As the starting material for use in our method, we use gamma-valerolactone. The reactions involved are the fusion of gamma-valerolactone with a cyanide, which may be either an alkali metal or an alkaline earth metal cyanide, and then acidification of the reaction mass to liberate gamma-cyanovaleric acid. This organic acid can then be purified by distillation.

The reactions are expressed as follows:

$$\text{NaCN} + \text{CH}_3\text{-}\overset{\overset{\displaystyle H}{|}}{\underset{\underset{\displaystyle O\text{------}C=O}{|}}{C}}\text{-CH}_2\text{-CH}_2 \longrightarrow$$

sodium cyanide     gamma-valerolactone $$\text{CH}_3\text{-CH(CH}_2\text{)}_2\text{CO}_2\text{Na} \xrightarrow{\text{acidified}} \text{CH}_3\text{-CH-CH}_2\text{-CH}_2\text{-CO}_2\text{H}$$
$$\quad\quad\quad | \quad\quad\quad\quad\quad\quad\quad\quad\quad\quad\quad\quad | $$
$$\quad\quad\quad \text{CN} \quad\quad\quad\quad\quad\quad\quad\quad\quad\quad\quad \text{CN}$$

sodium gamma-cyanovalerate     gamma-cyanovaleric acid

The following example will serve to illustrate the basic reaction involved:

*Example I*

A one-gallon autoclave with stirrer was charged with 1300 grams of gamma-valerolactone and 708 grams of granulated sodium cyanide. The charge was heated until a temperature of 240° C. was reached. At this point, an exothermic reaction set in and external heating was discontinued. In seven minutes the temperature rose to approximately 275° C. and a pressure of 225 p. s. i. developed. When the autoclave was cooled and the pressure released, a solid mass containing sodium cyanovalerate was recovered.

The recovered mass was dissolved in water and the solution acidified with dilute sulfuric acid to yield an organic layer which when distilled gave a 66% yield of gamma-cyanovaleric acid.

A further improvement in the method of Example I is represented by the following:

*Example II*

Crude sodium gamma-cyanovalerate (1 mole), obtained as in Example I, was melted with stirring and maintained at 235-240° C. while an equimolar mixture of sodium cyanide and gamma-valerolactone was added over a period of 1.5 hours at atmospheric pressure under reflux. The reaction, while exothermic, was maintained within the desired temperature range by the appropriate rate of addition of the cyanidelactone mixture.

The product when dissolved in water and treated with sulfuric acid as described in Example I was found to give a 93% yield of gamma-cyanovaleric acid.

While the last above example describes a method of operation involving the simultaneous addition of the reactants, other variations in the operation are possible. For example, the sodium cyanide may be admixed with the molten crude sodium gamma-cyanovalerate and the valerolactone added thereto.

It has been found that portions of the crude sodium gamma-cyanovalerate may be withdrawn from the reaction mixture during the course of the operation without impairing either the operation or the yield. Continuous operation is thus simulated.

Instead of using temperatures of 235 to 240° C. in the method of Example II, higher temperatures up to not over 300° C. may be used, but the lower temperatures are preferred, as is also substantially atmospheric pressure. Such low temperatures and pressures are not feasible in the process of Example I and are only made possible through the use of the cyanovalerate as flux in the fusion of the cyanide and gamma-valerolactone.

Instead of using sulfuric acid to liberate the gamma-cyanovaleric, other strong acidifying agents can be used, such as phosphoric acid, hydrochloric acid and others.

We claim as our invention:

1. The method of preparing gamma-cyanovaleric acid, which comprises fusing gamma-valerolactone at atmospheric pressure with a cyanide selected from the group consisting of alkali metal and alkaline earth metal cyanides in the presence of a previously prepared gamma-cyanovalerate and acidifying the resulting gamma-cyanovalerate to liberate gamma-cyanovaleric acid.

2. The method of preparing gamma-cyanovaleric acid, which comprises providing a fused reaction mass of an anhydrous cyanide selected from the group consisting of alkali metal and alkaline earth metal cyanides and gamma-valerolactone, adding to said fused mass reacting proportions of an anhydrous cyanide selected from said group and of gamma-valerolactone, maintaining the fused mass at a temperature not over 300° C. and at a pressure of around atmospheric to produce gamma-cyanovalerate, and acidifying the resulting reaction mass to liberate gamma-cyanovaleric acid.

3. The method of preparing gamma-cyanovaleric acid, which comprises providing a fused reaction mass of an anhydrous cyanide selected from the group consisting of alkali metal and alkaline earth metal cyanides and gamma-valerolactone, adding to said fused mass reacting proportions of an anhydrous cyanide selected from said group and of gamma-valerolactone, maintaining the fused mass at a temperature of about 235 to 240° C. and at a pressure of around atmospheric to produce gamma-cyanovalerate, and acidifying the resulting reaction mass to liberate gamma-cyanovaleric acid.

4. The method of preparing gamma-cyanovaleric acid, which comprises providing a fused reaction mass of an anhydrous cyanide selected from the group consisting of alkali metal and alkaline earth metal cyanides and gamma-valerolactone, adding to said fused mass reacting proportions of an anhydrous cyanide selected from said group and of gamma-valerolactone, maintaining the fused mass at a temperature of about 235 to 240° C. and at a pressure of around atmospheric to produce gamma-cyanovalerate, and acidifying the resulting reaction mass with dilute sulfuric acid to liberate gamma-cyanovaleric acid.

5. The method of preparing gamma-cyanovaleric acid, which comprises providing a fused reaction mass of sodium cyanide and gamma-valerolactone, adding to said fused mass reacting proportions of sodium cyanide and gamma-valerolactone, maintaining the fused mass at a temperature not over 300° C. and at a pressure of around atmospheric to produce sodium gamma-cyanovalerate, and acidifying the resulting reaction mass to liberate gamma-cyanovaleric acid.

References Cited in the file of this patent

UNITED STATES PATENTS

| | | |
|---|---|---|
| 2,449,987 | Gresham | Sept. 28, 1948 |
| 2,449,988 | Gresham | Sept. 28, 1948 |

OTHER REFERENCES

Wislicenus: Liebig's Annalen, vol. 233, pgs. 113–116 (1886).